(12) United States Patent
Brocke et al.

(10) Patent No.: US 7,920,565 B2
(45) Date of Patent: Apr. 5, 2011

(54) METHOD FOR UPDATING A DATA RECORD AND DEVICE FOR CARRYING OUT THE METHOD

(75) Inventors: Jens Brocke, Laatzen (DE); Andreas Aust, Hannover (DE); Frank Glaeser, Hannover (DE); Ralf Koehler, Hannover (DE)

(73) Assignee: Thomason Licensing, Boulogne-Billancourt (FR)

( * ) Notice: Subject to any disclaimer, the term of this patent is extended or adjusted under 35 U.S.C. 154(b) by 643 days.

(21) Appl. No.: 11/599,819

(22) Filed: Nov. 15, 2006

(65) Prior Publication Data

US 2007/0127377 A1  Jun. 7, 2007

(30) Foreign Application Priority Data

Nov. 16, 2005 (DE) .......................... 10 2005 054 978

(51) Int. Cl.
*H04L 12/28* (2006.01)
(52) U.S. Cl. ........................................ 370/392; 370/389
(58) Field of Classification Search .................. 370/392, 370/389, 396, 235, 230, 252, 395.1; 711/108; 386/46, 111, 94; 709/229, 239
See application file for complete search history.

(56) References Cited

U.S. PATENT DOCUMENTS

| | | | |
|---|---|---|---|
| 6,701,061 B2 * | 3/2004 | Karasudani et al. | 386/46 |
| 7,136,926 B1 * | 11/2006 | Iyer et al. | 709/229 |
| 7,193,997 B2 * | 3/2007 | Van Lunteren et al. | 370/392 |
| 7,340,570 B2 * | 3/2008 | Lakshmanamurthy et al. | 711/154 |
| 7,545,748 B1 * | 6/2009 | Riddle | 370/235 |
| 2003/0101448 A1 | 5/2003 | Kim | |
| 2003/0126272 A1 * | 7/2003 | Corl et al. | 709/230 |

FOREIGN PATENT DOCUMENTS

| | | |
|---|---|---|
| DE | 19820936 C1 | 6/1999 |
| EP | 0 609 936 A2 | 8/1994 |
| EP | 0 823 798 A1 | 2/1998 |
| EP | 1 501 047 A2 | 1/2005 |
| WO | WO 2005/069624 A2 | 7/2005 |

OTHER PUBLICATIONS

Search Report dated Jul. 28, 2006.
"Digital Video Broadcasting (DVB)", ETSI TS 102 034 V1.1.1, Mar. 2005, European Telecommunications Standards Institute, 91 pgs.

* cited by examiner

*Primary Examiner* — Hanh Nguyen
(74) *Attorney, Agent, or Firm* — Robert D. Shedd; Jeffrey M. Navon

(57) ABSTRACT

When updating a data record identified by a version number, the problem exists that a simple not equal to comparison or greater than comparison is often insufficient for ascertaining the up-to-date nature of the newly received data record, particularly if the data record is transmitted to a receiving station via an unsecured data link and the version number originates from a limited range which is repeatedly run through periodically.
The invention solves the problem by virtue of the fact that it divides the range of values of the version number into the ranges "old" and "new", on the basis of the current value of a version number. The periodicity with which the range of values is run through is taken into account in this case, however. That is to say that the range "old" or the range "new" may perfectly well include the jump from the highest value in the range of values to the lowest value in the range of values. If the version number of the newly received data record lies in the range "new", the new data record is accepted as a current data record, and if not it is correspondingly rejected.

14 Claims, 7 Drawing Sheets

METHOD FOR UPDATING A DATA RECORD AND DEVICE FOR CARRYING OUT THE METHOD

This application claims the benefit, under 35 U.S.C. §119 of German Patent Application 102005054978.0, filed Nov. 16, 2005.

FIELD OF THE INVENTION

The invention is associated with the field of multimedia services. It relates to the technical field of updating data records, e.g. items of additional information for audio or video broadcasts or software updates. In particular, the technical field relates to the field of transmitting video contents via broadband systems, such as, for example, transmissions of video or audio contents over the Internet.

BACKGROUND OF THE INVENTION

For the transmission of video contents on the Internet for services such as Internet TV or video on demand, in the context of the known DVB system (Digital Video Broadcast), a specification was created which defines a transmission protocol according to which such digital video contents can be transmitted via the Internet. The specification is known under the designation DVB-IPI (Digital Video Broadcast Internet Protocol Infrastructure). This specification describes, inter alia, the coding of information for the description and selection of audio/video data streams (also called AV streams) in the form of XML documents. In the specification this information is also designated as "Service Discovery & Selection" information (corresponding to SD&S). The exact designation of the DVB-IPI specification reads as follows: Digital Video Broadcasting (DVB); "Transport of DVB Services over IP": DVB Document A086, July 2004.

The SD&S data contain information about the service providers themselves and about their various service offerings (Live Broadcast, Content on Demand, AV Streaming with Trick Modes, etc.). In this case, the data are structured as follows: the type of SD&S data is indicated by the so-called payload ID. The data belonging to a payload ID of a service provider are designated as the so-called SD&S data record. An SD&S data record is typically subdivided into a plurality of independent segments, so-called SD&S segments, in order to limit the effects of possible changes to as few segments as possible. However, a data record may also comprise a single segment. Each SD&S segment of a service provider is identified by the combination of payload ID and segment ID. In order to be able to signal changes of a segment, each segment additionally has a version number, the so-called segment version number. If the data of a segment change, the version number of the segment has to be incremented in order to indicate the change and to enable the retrieval of this specific version. In the DVB-IPI specification, two different transmission modes are described for the transmission of the SD&S data. In addition to the retrieval of SD&S data by HTTP (Hyper Text Transfer Protocol), which is also referred to as the so-called "Pull Mode", DVB-IPI specifies the transmission protocol DVB-STP, by which the data of an SD&S server of a service provider are periodically transmitted by UDP (Multicast) to all interested receivers. This mode is designated as the "Push Mode". UDP corresponds to the known "User Datagram Protocol" from Internet technology. The invention that is to be described is principally used in the "Push Mode". In this mode, the SD&S segments are optionally fragmented further into so-called SD&S sections, and provided with a DVB-STP header. Such a section is periodically sent as a UDP packet by multicast.

On the basis of the service provider ID, which is derived implicitly from the IP multicast address or is explicitly specified, the payload ID, the segment ID and the segment version number, the receiver combines the segments again from the individual sections and processes the SD&S data contained in order to be able e.g. to display an electronic program guide. The receiver identifies changes of a segment from the changed segment version number, and it can thereupon replace the old data with the new data. However, the decision as to which data are the old data and which are the new, on account of the unsecured transmission by UDP, is not as trivial as it might at first appear.

SUMMARY OF THE INVENTION

Although the specification prescribes an incrementing of the segment version number when a segment is altered, the following problem exists in the simple implementation of up-to-date verification in the form "new segment version number=old segment version number+1":

Due to the unsecured UDP transmission, DVB-STP packets can be lost at any time, so that in the event of rapidly successive segment changes, the DVB-STP packets with segment version numbers from the middle range might never arrive at the receiver. This means, however, that the recent data would also be ignored since they would no longer follow the strict incrementing rule. Secondly, the specification does not explicitly prescribe that a DVB-STP transmitter actually has to transmit at least one DVB-STP packet per segment version. In the event of rapidly successive segment changes it would be conceivable, therefore, for a new segment version in the DVB-STP transmitter already to be replaced by a newer version before the corresponding DVB-STP packet for the first innovation has actually been transmitted, so that a jump in the segment version number of the received DVB-STP packets can likewise occur at the receiver, and such data packets would be ignored during verification in accordance with the strict incrementing rule.

The conceivable up-to-date verifications in the form "new segment version number not equal to old segment version number" or "new segment version number>old segment version number" also involve problems. Although the not equal to rule is simple to implement, it has significant disadvantages with regard to the stability of the version of an SD&S segment that is considered to be current. This is because the unsecured UDP transmission does not ensure that the DVB-STP packets arrive at the receiver in the same order as they were sent by the transmitter. This may have the effect that in the event of a segment change, a DVB-STP packet with a newer segment version "overtakes" a packet with an older segment version on the transmission path. Upon application of the not equal to rule, the receiver in this case, proceeding from the old version, would consider firstly the new segment version and then once again the old segment version to be current. Only when a repeated transmission of the new segment version is received would the receiver identify said new segment version as current. This is because the individual SD&S segments are repeated again and again at a certain time interval and within the specification there is a prescription according to which a segment must be regarded as invalid if it has not been refreshed within a predetermined time. Depending on the number of DVB-STP packets received in disordered fashion, the current segment version may also change even more frequently. The resultant unpleasant "switching back and forth" of a segment can unnecessarily delay the acceptance of the segment that is actually current, because it might possibly be only the n-th repetition of the new segment version that gains acceptance even though the first reception should already have led to acceptance.

Unpleasant effects would be apparent to the user and possibly confuse him. By way of example, an electronic program guide generated from the SD&S data, in the event of a program change within a channel, might possibly change back and forth multiply between displaying the previous broadcast and the current broadcast.

The invention solves the problem in the following way:

For the up-to-date check when a segment changes, instead of the not equal to comparison or the strict incrementing rule, a rule in the form "new segment version number>old segment version number" should be carried out which concomitantly takes account of the modulo behaviour in the incrementing of the version number. By way of example, an 8-bit value is provided for the segment version number in the DVB-IPI specification. The range of values for the version numbers therefore corresponds to the range 0 to 255. If the last value of this range has been reached, further incrementing takes place and the range of values is then run through anew from the beginning again. Consequently, the mathematical greater than comparison cannot be applied to the segment version number, rather the invention proposes that, proceeding from the version number regarded as current, the range of values for the version numbers is classified into the ranges "old" and "new", in which case one of the two ranges may include the "overflow" from the value 255 to the value 0. The two ranges are shifted analogously to the current version number in this case. The ranges can be chosen to have different sizes. The larger the "old" range, the lower the probability of an actually obsolete segment version being accepted as current. On the other hand, with an enlarged "old" range the probability increases that an actually current segment version will be ignored as obsolete in the event of relatively long disturbances of the transmission path and numerous segment changes or in the event of segment changes carried out frequently at the transmitter end without transmission of the associated DVB-STP packet. For these reasons it is advantageous if neither of the two ranges ever covers a large part of the range of values of the segment version numbers.

The advantage of the invention is that potentially obsolete versions of a segment are ignored and changing back and forth between different versions of the segment with temporal overlapping of the reception of data packets comprising the different versions is consequently avoided. The additional outlay in the implementation of the invention remains relatively low. Although the version number of a current segment cannot be absolutely prevented from coming within the "old" range, particularly in the event of very frequent changes or large jumps in the segment version number, this case should occur only very rarely. Moreover, in the case of DVB-IPI, the prescription of the refreshing of a segment ensures that a segment version incorrectly regarded as current is superceded again by a newly received version with an arbitrary version number after typically 60 seconds.

Further improvements and developments are possible by means of the measures presented in the dependent claims. In order also to be able to ascertain changes of a segment which are not explicitly signalled by a changed version number, it is advantageous if the further data of a newly received segment are additionally compared with the data of the segment deemed current in the case where the version number of the newly received segment matches the version number of the current segment. The received segment is accepted as a valid refresh of the segment deemed current only when the compared data match. Thus, by way of example, in the case of the DVB-IPI system, all the other indications in the DVB-STP header and also the actual payload data of a data packet may be compared with the previously received data. This is because it is possible to transmit a segment of an SD&S data record in different ways in the DVB-STP packets. Error protection with CRC check code is thus optional for the segment data. Fragmentation into sections may likewise be effected in various ways. In addition, entries in a DVB-STP header are also present by means of which it is possible to specify the use of compression and encryption methods that have not yet been specified in greater detail at the present time. Since the specification does not demand that a change of these transmission parameters likewise be signalled by a changed segment version number, it would be possible for a receiver to receive the differently coded DVB-STP packets with an identical segment version number and incorrectly assemble from these possibly incompatible packets an SD&S segment which would result only in erroneous output results. This is prevented by the measure described.

Furthermore, DVB-STP packets having a content that is inconsistent with the segment regarded as current, and having the same version number, can be handled in different ways. Firstly, these packets can simply be ignored. In the case of the DVB-IPI specification this would have the effect that segment data possibly changed deliberately by the transmitter would not gain acceptance until after the rejection of the segment regarded as current for lack of a refresh because the inconsistent packets should not be treated as a refresh of the current segment. However, this procedure might take up to 60 seconds. On the other hand, these packets may be regarded as being associated with a new version of the segment regarded as current. In this case, the segment regarded as current would be immediately rejected and a segment with the newly received data would be established. However, since up-to-date verification is no longer possible on account of the identical segment version numbers, the content of the segment regarded as current might repeatedly jump back and forth as long as DVB-STP packets associated with both versions of the segment are still being received. The decision as to whether the inconsistent packets are ignored or directly accepted could be designed in a configurable manner in the receiver, for example, depending on whether the stability or the up-to-date nature of the SD&S data is more important to the receiver. Furthermore, it would be possible for this configuration to be adapted dynamically to the number of inconsistent DVB-STP packets received.

Dynamic range classification into the ranges "old" and "new" may also be advantageous. Particularly if the observed change frequency of a segment is used for carrying out dynamic range classification, a further improvement of the method according to the invention is possible. Using a known or an estimated propagation time difference on the transmission path for ascertaining the change frequency may also be advantageous for the dynamic range classification.

BRIEF DESCRIPTION OF THE DRAWINGS

Exemplary embodiments of the invention are illustrated in the drawings and are explained in more detail in the description below.

In the figures.

DETAILED DESCRIPTION OF THE INVENTION

Figure 1:
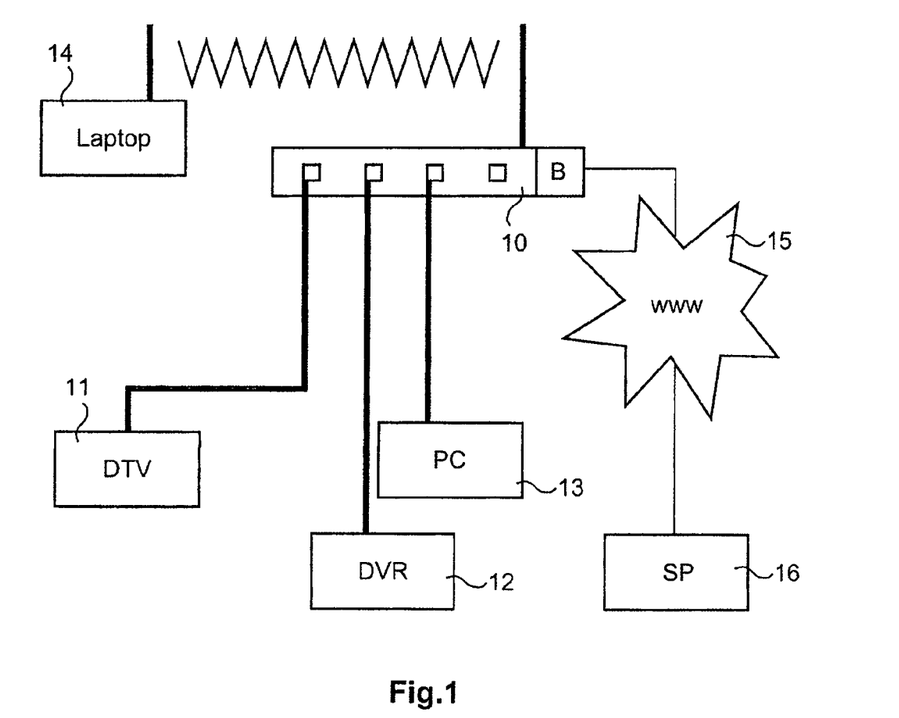
FIG. 1 shows a home network with connection to the Internet via a DSL router.

FIG. 1 shows a home network, based on Ethernet technology, in which the various home network devices are connected by Ethernet cables to a DSL router 10. In this case, the reference numeral 11 designates a digital TV set—such a TV set has a decoder for digital video data—, the reference numeral 12 designates a digital video recorder and the reference numeral 13 designates a personal computer. The reference numeral 14 designates a portable personal computer, for example a laptop or notebook. The latter is connected wirelessly to the DSL router 10. One of the customary wireless Ethernet connection techniques corresponding to one of the IEEE 802.11x specifications may be used for this purpose. The DSL router 10 is connected to the Internet 15 via a telephone connection. The illustration likewise shows that a service provider 16 can be selected by DSL router 10 via the Internet 15, from which digital video content can be requested in the form either of an Internet TV service or of a video-on-demand service.

Figure 2:
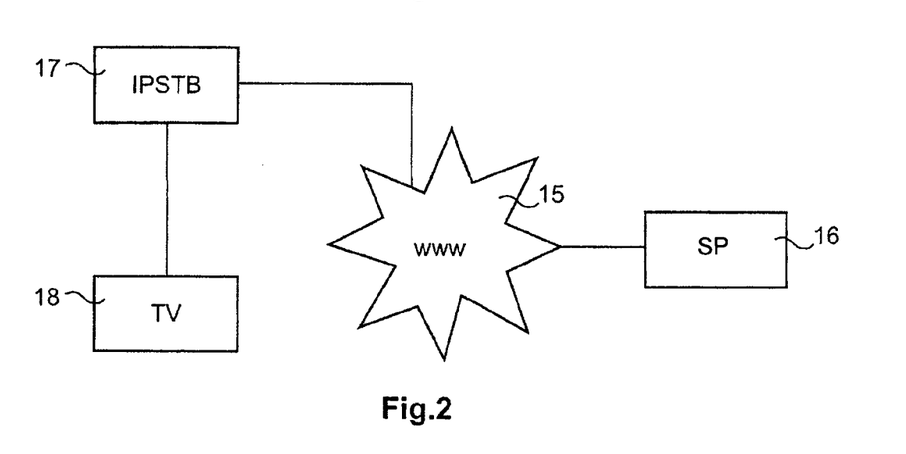
FIG. 2 shows a video decoder with the possibility of connection to the Internet and a connected television set.

FIG. 2 shows another possibility for connection to the Internet. In this figure, the reference numeral 18 designates a TV set, which is connected to a video decoder 17, which is also designated as IP set-top box. Said video decoder 17 is directly connected to the telephone connection, that is to say contains an integrated DSL modem. Furthermore, the illustration likewise shows the service provider 16 to which a connection can be established. In these exemplary embodiments, the DVB-IPI standard is used for the transmission of video contents via the Internet. In other words, both the DSL router 10 and the digital video decoder 17 must have implemented the protocols described in the DVB-IPI specification.

Figure 3:
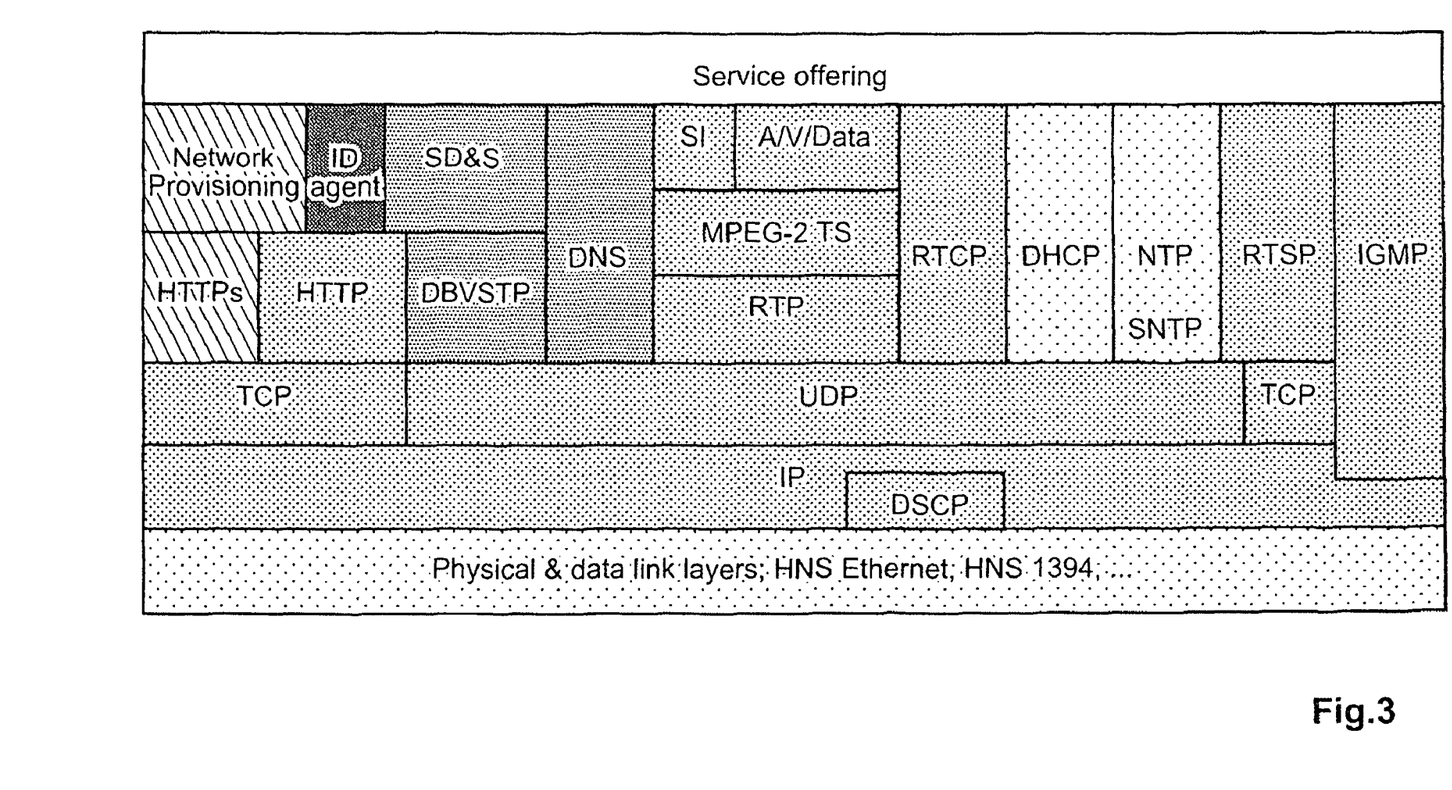
FIG. 3 shows a protocol diagram for a device designed according to the DVB-IPI standard.

The protocols shown in FIG. 3 are not all relevant to the invention and are correspondingly not explained in greater detail either. For more detailed information about these protocols, reference is made to the customary literature or the associated specifications. As described in the introduction, the SD&S protocol serves to make available to a service subscriber the necessary information about the services made available and the content offered therein. In this case, "Service Discovery" is a mechanism which permits a subscriber to find DVB services on the Internet. This mechanism results in a list of service offerings being conveyed to the user, so that he has a possibility of selecting which service he would like to take advantage of. The selection itself takes place later and relates to the selection service associated with the SD&S mechanism.

There are two transmission modes made available for enabling SD&S information to reach a subscriber. In the DVB-IPI standard, one transmission mode is designated as the "Push Mode", and the other is designated as the "Pull Mode". In the "Pull Mode" the SD&S data are transmitted to the receiver by means of the HTTP protocol. In the case of HTTP (corresponding to Hyper Text Transfer Protocol), either a receiving station requests the desired data (HTTP-Get) or the transmitting station for its part makes the data available to a subscriber station by means of HTTP-Post. As shown in FIG. 3, the HTTP protocol is set up on the TCP protocol (corresponding to Transmission Control Protocol). As is known, this protocol is a safeguarded transmission protocol in which the individual transmitted data packets have to be confirmed at the receiving end, so that the transmitter end repeats failed packets if the confirmation of reception does not appear.

A second possibility for the transmission of SD&S information is likewise shown in FIG. 3. This involves the so-called "Push Mode", which is used to send the service information simultaneously by multicast to a plurality of subscribers. The DVB-STP protocol is used for this purpose. This involves a specific transport protocol for communicating the SD&S information.

The SD&S information is compiled in XML documents. These essentially comprise text data, that is to say character code. All programme information of a specific type for a service provider may be stored in an SD&S data record. Therefore, if a service provider provides a plurality of television programmes, all programme information of this plurality of programmes could therefore be stored in an XML document for this data record. The document can therefore reach a considerable size of several kilobytes or else several tens of kilobytes. Since the programme information has to respond to current developments, the DVB-IPI standard permits transmission of a data record fragmented into a plurality of segments, each segment being an independent XML document containing parts of the data record. This allows a situation in which one document containing the entire data of the data record does not have to be transmitted anew in the event of a programme change by a programme provider, rather the programme change affects, if appropriate, only one segment of the data record.

Figure 4:
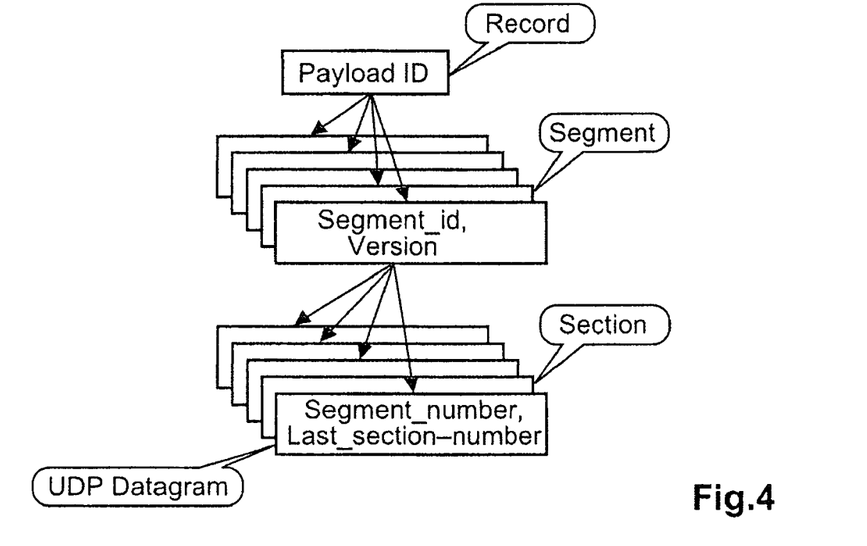
FIG. 4 shows the fragmentation of an SD&S data record into segments and sections.

The fragmentation of an SD&S data record is illustrated in FIG. 4. The DVB-IPI specification permits various types of XML documents. These are identified by the so-called payload ID. There is "Service Provider Discovery" information, "Broadcast Discovery" information, "Content on Demand Discovery" information, information with regard to "Services from other Service Providers", "Package Discovery" information and also "User Private" information.

A data record can be classified into a number of segments, which for their part are identified by Segment_ID and version number. The version number is defined as an 8-bit value in the specification. Each time a new segment version is provided on the part of the service provider, the version number of said segment is to be incremented. Since the version number is designed as an 8-bit number, the range of values for the segment version is defined from 0 to 255. When the highest value of 255 is reached, further incrementing is effected and the range of values is run through again from 0 to 255. In addition, it is also permitted to subdivide the individual segments further into so-called sections. This can likewise be seen from FIG. 4. For this purpose, a respective section number is assigned to a section. The highest occurring section number of the associated segment is additionally specified. The XML document of a segment that has been finely subdivided in this way is transmitted in portions according to the UDP protocol. A UDP data packet in each case comprises the data of a section.

Figure 5:
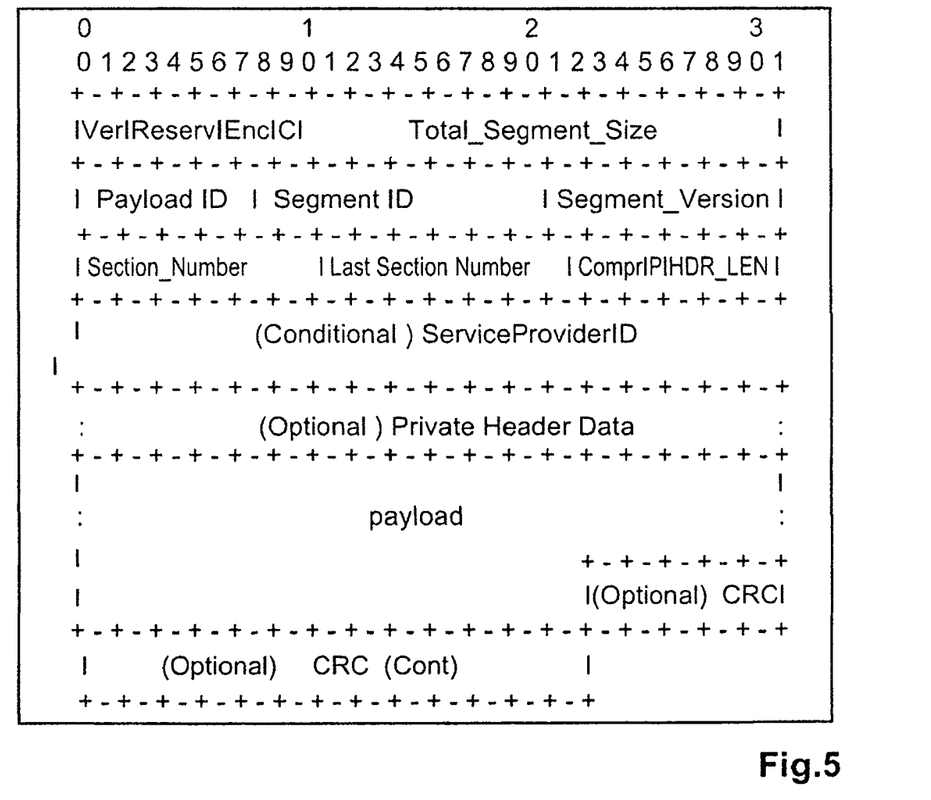
FIG. 5 shows the format of a DVB-STP data packet.

The format of an associated UDP data packet is shown in FIG. 5. The individual fields in this packet are specified in the DVB-IPI standard. As shown, the second quadlet contains the indication of payload ID, segment ID and segment version number. Payload ID and segment version number are 8-bit numbers, while the segment ID is a 16-bit number. Within such a data packet there are also optional fields, which will be discussed in more detail later.

As mentioned, the UDP protocol is used for the transmission of the segments in sections. However, as is known, the UDP protocol is an unsecured data transmission protocol in which no reception confirmation messages are provided. During the transmission of these UDP packets via the Internet, it can happen that entire packets are lost, that packets transmitted at an earlier point in time are actually later in arriving at the receiver than packets transmitted subsequently, and so on. Disturbances may temporarily occur particularly in the case of wireless transmissions in the transmission path, so that entire segments or even entire SD&S data records may be lost even for a relatively long time.

Figure 6:
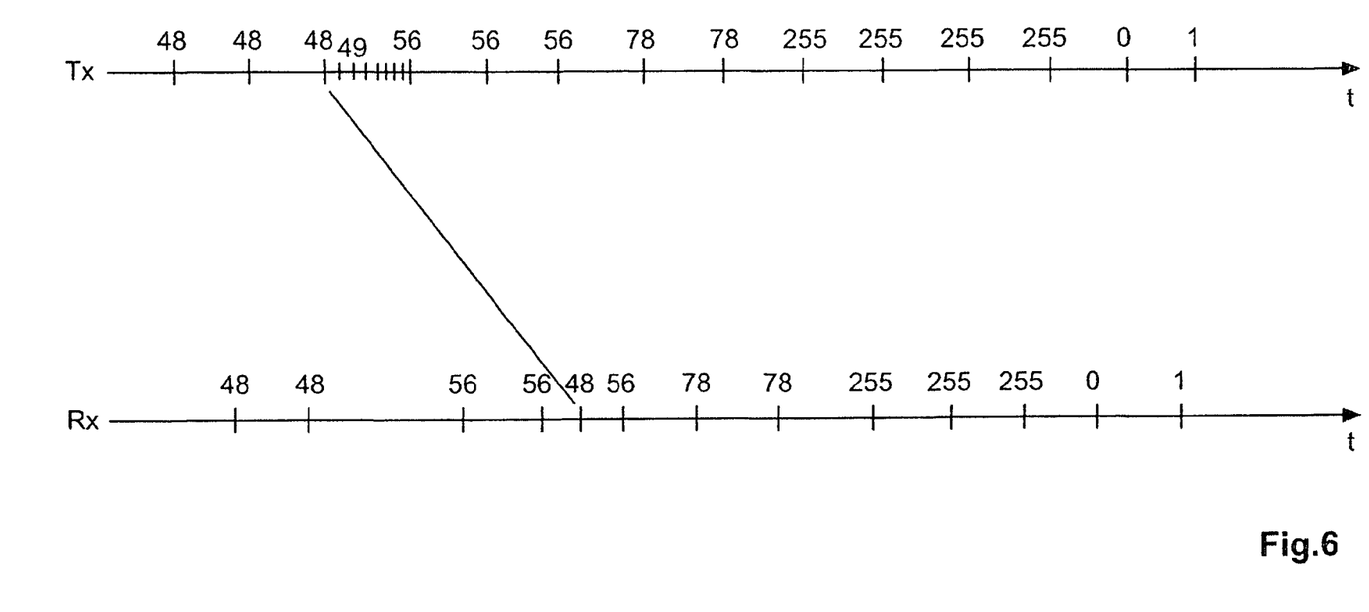
FIG. 6 shows a sequence of transmitted DVB-STP data packets and also an altered order in the reception of these data packets.

FIG. 6 illustrates the problem in greater detail. The broadcasts of a segment of an SD&S data record at the transmitter end are shown on the upper time line. The numerical indication relates in each case to the segment version number. The instants at which the broadcast segments arrive at the receiver are indicated in the lower part of the figure. The DVB-IPI specification provides for the various segments to be periodically refreshed. Overall, a maximum time period of 30 seconds should not be exceeded for the transmission of the SD&S information. Since the information is to be continually repeated, there should be a refresh in each case after 30 seconds. If no refresh has arrived within 60 seconds in the "Push Mode", the respective receivers are to assume that the relevant segment has been deleted. They must then delete the obsolete segment, as a result of which a subsequently received segment having an arbitrary segment version number is regarded as current. The segment having the version number 48 is transmitted in each case in the first three broadcasts in FIG. 6. The lower part of the figure illustrates when the associated segments arrive at the receiver. The third broadcast of the segment having the version number 48 is greatly delayed, as illustrated. Specifically, the segment having the version number 56 has arrived at the receiver twice in succession in the meantime. Although all the other segments having version numbers from 49 to 55 were broadcast, they were lost on the transmission path. It is now difficult for the receiver to decide whether it is to accept as new the arrived segment having the version number 48 or is to remain with the previously arrived segment having the version number 56. A simple not equal to comparison would lead to the acceptance of the segment having the version number 48. A simple greater than comparison would lead to the segment having the version number 48 being ignored. Since a segment having the version number 56 is subsequently received again, jumping back and forth might occur with regard to this segment.

FIG. 6 subsequently shows that segments having the segment version number 78 are transmitted and received. The segments established in between having the numbers 57 to 77 were not even broadcast by the service provider in the first place since they arose as successive changes in such a short time that they did not end up being broadcast. The same situation is then illustrated when the version number 78 is even followed by the version number 255. The changeover of the segment version number from 255 to the start value 0 is also shown at the end of the interval shown. The decision for the receiver as to which segment it is to regard as more current becomes difficult here with a simple greater than comparison.

In order to avoid the above-described problems with a possible "Version Ping-Pong" the invention provides for carrying out a greater than comparison or less than comparison based on range classification of the range of values of the version number indication.

Figure 7:
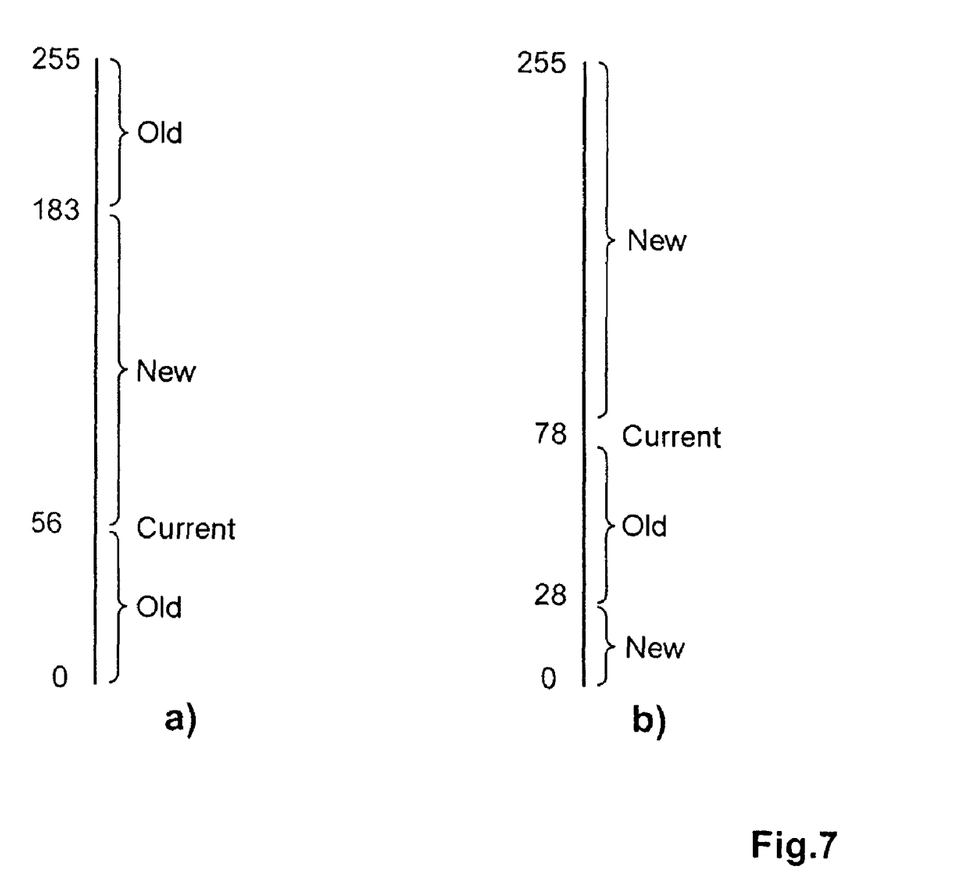
FIG. 7 shows the classification according to the invention of the range of values for the version numbers into the ranges "old" and "new"

FIG. 7 illustrates the associated range classification. The range of values from 0 to 255 for the version number indication is shown in the case of FIG. 7a. This takes into consideration the case, according to FIG. 6, in which the currently received segment version number relates to the value 56. On the basis of this current value, the value range was classified into the two ranges "old" and "new". In this case, the range "new" relates to the range of values from the current version number indication plus 1 up to the value of the current version number indication plus 127. The range "new" therefore goes from 57 to 183. The range "old", by contrast, relates to the range from current version number indication minus 1 to current version number indication minus 128. A division in two is therefore involved, both ranges "old" and "new" being almost equal in size. What is complicated about this range classification is that it is necessary to take account of the periodicity in the version number indication. Therefore, the calculation has to be performed cyclically within the range of values from 0 to 255, so that the value 184 is attained when calculating 56 minus 128.

After the range classification on the basis of the current value, according to the invention an analysis is performed concerning which of the ranges contains the version number of the newly received segment. If, as in the case illustrated, the current value 56 is followed by the value 48, that lies in the range "old" in accordance with FIG. 7a). Therefore, this segment would not lead to the acceptance of the segment in the receiver after the verification according to the invention. If the situation is such, as likewise shown in FIG. 6, that the current value 56 is followed by the version number 78, it would be ascertained that this value lies in the range "new" in accordance with FIG. 7a) and the segment would be accepted. Conversely, the situation would be that if the current version number indication 78 were present and the value 255 subsequently arrived as version number indication, this would not lead to acceptance, because the value 255 would still lie in the "old" range in the case of the range classification in FIG. 7a).

If the version number 255 would have gained acceptance after multiple repetition, then acceptance would occur in the event of a change from the value 255 through to the value 0, because the value 0 would in turn lie in the "new" range.

FIG. 7b) shows another classification of the range of values for the version number indication. The same principle is again taken as a basis here, except that in that case, proceeding from the current value 78, the range classification is performed such that the substantial portion of the range of values is allotted to the range "new". The latter extends from the value 79 up to the value 255 and beyond that up to the value 27. The "old" range then extends only from the value 28 up to the value 77. With this range classification, the subsequent version number indication 255 would still lie in the range "new" and the segment would be accepted.

The larger the "old" range, the lower the probability of an actually obsolete segment version being accepted as current. On the other hand, with an enlarged "old" range, the probability increases that an actually current segment version will be ignored as obsolete in the event of relatively long disturbances of the transmission path and numerous segment changes or in the event of frequent segment changes in the DVB-STP server without the transmission of a DVB-STP packet. For these reasons, it is advantageous, rather, for neither of the two ranges ever to cover a large part of the range of values of the segment version numbers. One possible division would be, for example, to apportion the segment version number to the extent of two thirds to the "new" range and one third to the "old" range.

Alternative embodiments are aimed at dynamically changing the sizes of the "old" and "new" range. This may be effected for example on the basis of the observed change frequency of the SD&S information in the data stream. In the event of frequent changes, the size of the "old" range could then be increased, for example, in order to be able to suppress more obsolete segment versions.

The main reason for the possible "Version Ping-Pong" is the propagation time differences of the UDP packets on the transmission path. If the maximum propagation time difference of the transmission path is known or measurable or can be estimated, the size of the "old" range can be oriented in the context of expedient minimum and maximum values to the number of segment changes which can be observed within this time period.

A complete suppression of obsolete segment versions fundamentally cannot be achieved. However, this is not absolutely necessary either, because the system is designed such that a segment has to be continuously refreshed, so that a segment version considered incorrectly as current would occur only transiently, would be rejected by the DVB-STP receiver after typically 60 seconds and afterwards a newly received version of the segment having an arbitrary version number would be accepted again, as described.

Figure 8:
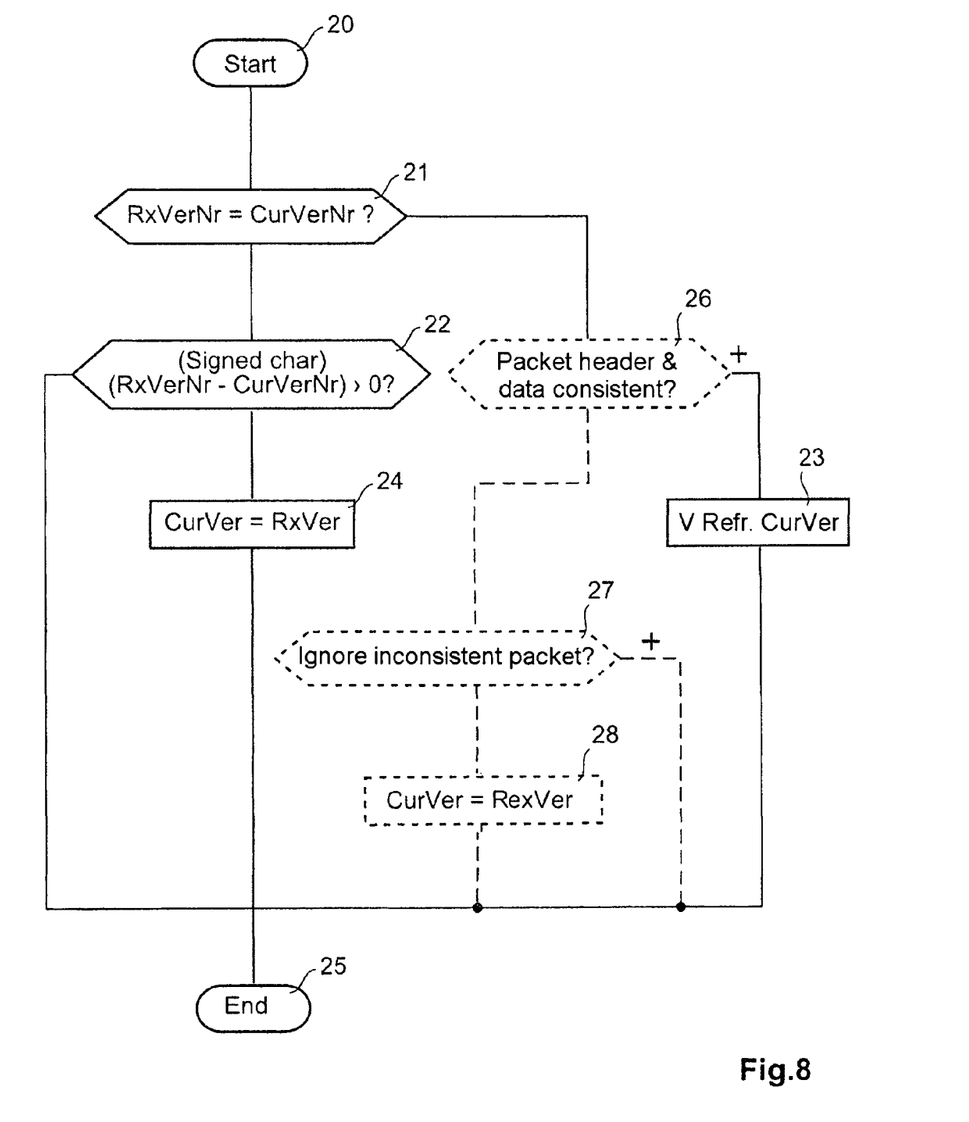
FIG. 8 shows a flowchart for a program which is used to effect the up-to-date check on the basis of the version numbers of a segment.
Figure 9:
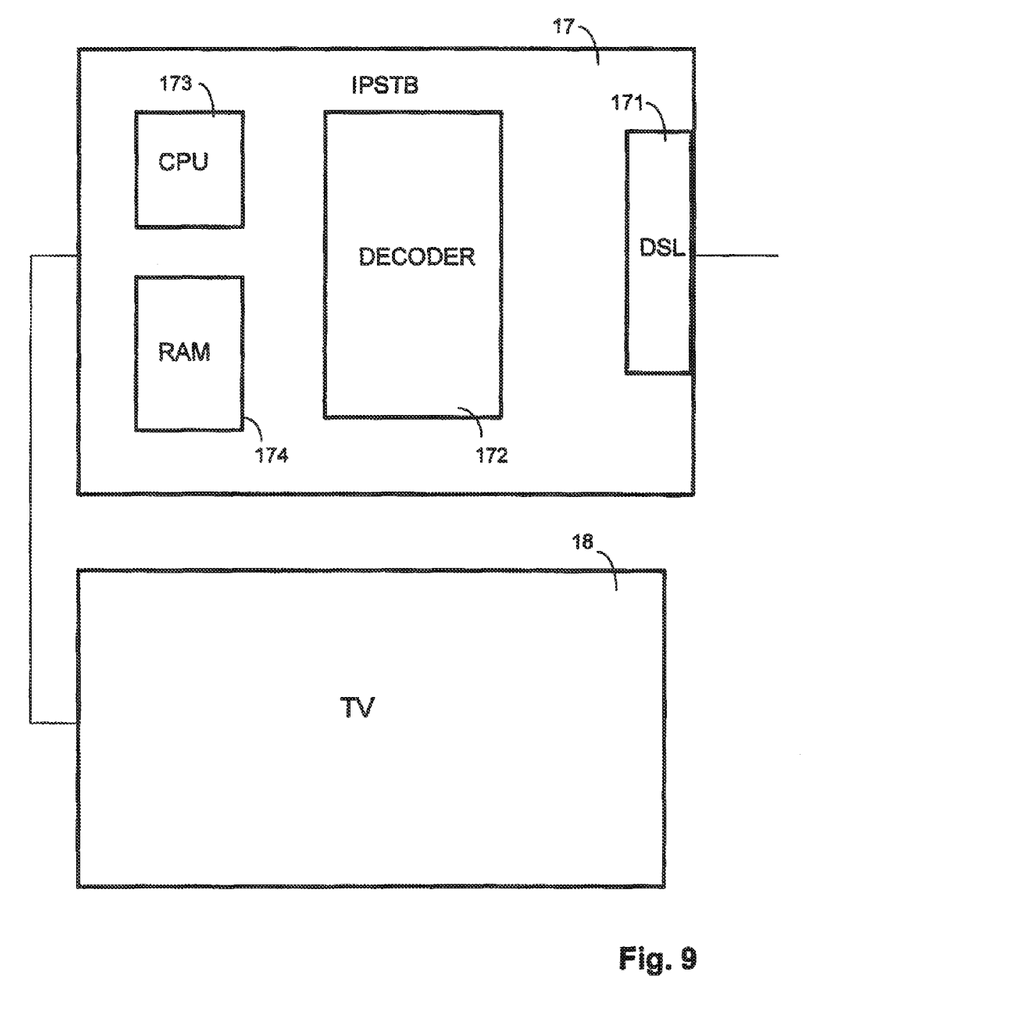
FIG. 9 illustrates the internal structure of the IP set top box 17 in FIG. 2.

FIG. 8 shows a possible implementation for the greater than comparison according to the invention in the course of checking the up-to-date nature of a received segment. The start of the associated program is identified by the reference numeral 20. In interrogation 21, a check is made to determine whether the received version number indication corresponds to the currently valid version number indication. If so, the program would branch to program step 23 in which the newly received segment would be accepted as a valid refresh of the known segment. If the newly received version number is not equal to the current version number, then a further interrogation follows in program step 22, where a check is made to determine whether the received version number lies within the range from the current version number plus the value 1 to the current version number plus the value 127, in which case, however, this comparison takes account of the modulo-256 behaviour in the version number allocation. This is illustrated in the syntax of the programming language C in FIG. 8. If the checked version number meets this condition, then it is clear that the received version number lies within the range "new", and, in program step 24, the acceptance of the received segment would ensue and the version number indication for the current version number would also be altered and set to the value of the received segment. The program would then be ended in program step 25. If the interrogation condition in program step 22 were not applicable, the version number in the received data packet would be assigned to the range "old"; in consequence the corresponding segment would not be accepted and the version number indication for the current segment would also remain unchanged. The received data packet would likewise not be accepted as a valid refresh of the current segment. Instead, the program would be ended once again in program step 25.

It is indeed provided in the DVB-IPI specification that in the event of every change to the SD&S data, the version number indication for the segment must also be increased by 1. For up-to-date verification, the specification merely demands the comparison of "Service Provider ID", "Payload ID", "Segment ID" and segment version. It has been shown that this need not always be sufficient. This is because the specification affords diverse possibilities for coding one and the same segment in different ways. In this regard, reference is made to FIG. 5 again. Thus, by way of example, error protection based on a CRC code is optionally specified for the segment data. Error protection therefore need not necessarily be used. The fragmentation of segments into sections may be effected in arbitrary portions and the header of the packet furthermore contains entries by means of which it is possible to specify the use of compression and encryption methods that have not yet been specified in greater detail at the present time.

In this regard, attention is drawn to the two bits ENC having the numbers 5 and 6 in the first quadlet and also the three bits COMPR in the third quadlet. However, the specification does not demand that a change of these transmission parameters likewise has to be signalled by a changed segment version number, since the actual payload of the DVB-STP packet has not then changed either. If a receiver that has received differently coded DVB-STP packets having an identical segment version number assembles the SD&S information from them again, errors may occur because the data situated therein are incompatibly coded or arranged. Furthermore, it is theoretically possible that, in the event of numerous changes of SD&S data and relatively long disturbances in the transmission network, a newer version of a segment has theoretically acquired the same segment version number as an older version of the segment without the receiver then being able to identify the updating.

Therefore, in addition to the comparison of "Service Provider ID", "Payload ID", "Segment ID" and segment version number as demanded by the specification, an improved DVB-STP receiver should also compare further indications in the DVB-STP header of the received packets and furthermore optionally the actual payload data of the packets with the previously received packet for the current segment. That would prevent the generation of inadvertently incorrectly compiled SD&S information. These measures may be effected in addition to the up-to-date check on the basis of the version number indication with range classification on the basis of the current value or else separately, that is to say without the comparison with range classification. This additional verification is illustrated by dashed lines as an optional step in FIG. 8. The additional interrogation has the reference numeral 26. It is only in the event of consistent DVB-STP header and identical segment data that the received DVB-STP packet is accepted as a valid refresh of a known segment in program step 23.

If the interrogation in program step 26 reveals that the DVB-STP header or the segment data have changed, further optional program steps may follow. In program step 27, a check is made to determine whether or not the received, inconsistent packet is to be ignored. If the packet is ignored, then the program is ended directly in program step 25. Otherwise, the current segment is rejected in program step 28 and a segment with the newly received data is established. Only afterwards is the program ended in program step 25.

What is claimed is:

1. Method for updating a segment of a data record in a digital video or audio receiver, said data record consisting of at least a single segment, in which the segment is identified by a version number, a limited range of values being available for the segment version number and the range of values being run through periodically, the segment being transmitted in the form of one or a plurality of data packets over an unsecured data link, characterized by the steps of:
- classifying the range of values for the version number into two sub-ranges, hereinafter called "old" and "new", wherein for the division of the sub-ranges the periodicity with which the range of values is run through and the current version number is taken into account, so that the sub-range "new" may span values in the upper part of the range of values starting from the current version number up to a defined value in the lower part of the range of values, or that the sub-range "old" may span values in the lower part of the range of values starting from the current version number down to a defined value in the upper part of the range of values,
- checking the range in which the version number of a newly received segment lies,
- accepting the newly received segment as a current segment if the check revealed that the version number of the newly received segment lies in the range "new", and
- rejecting the newly received segment if the check revealed that the version number of the newly received segment lies in the range "old".

2. Method according to claim 1, the range classification into the ranges "old" and "new" being adapted dynamically such that the ranges "new" are increased or decreased and "old" are decreased or increased on the basis of an observed change frequency of the segment.

3. Method according to claim 2, with an observation time period for the change frequency being predefined by the known or an estimated/measured propagation time difference on the transmission path.

4. Method according to claim 3, characterized by the further step of:
- ignoring the newly received segment if the comparison of the further data revealed that the compared data do not match.

5. Method according to claim 1,
characterized by the further steps of:
- comparing further data of the newly received segment with the data of the currently valid segment if the version number of the newly received segment matches the version number of the currently valid segment,
- accepting the newly received segment as a valid refresh if the comparison of the further data revealed that the compared data match.

6. Method according to claim 1, the data packets comprising a header part and payload data part.

7. Method according to claim 6, the consistency of the data in the header part being checked as comparison of further data.

8. Method according to claim 1, the newly received segment being rejected as invalid if not refreshed within a predefined time.

9. Method according to claim 1, the data of a segment being transmitted via an unsecured data link, particularly in the form of one or a plurality of UDP packets, corresponding to "User Datagram Protocol".

10. Method according to claim 1, the data record corresponding to the SD&S data in accordance with the DVB-IPI specification, where DVB-IPI stands for Digital Video Broadcasting "Transport of DVB Services over IP" and SD&S stands for "Service Discovery and Selection".

11. Device according to claim 10, characterized in that the means for updating the segment compare further data of the newly received segment with the data of the current segment if the version number of the newly received segment matches the version number of the current segment, and in that the means for updating the segment accept the newly received segment as a valid refresh of the current segment if the comparison of the further data revealed that the compared data match.

12. Device according to claim 10, characterized in that the means for updating the segment accept the newly received segment as a current segment if the comparison of the further data revealed that the compared data do not match.

13. Device for updating a sequence of a data record, having a communication interface for receiving/transmitting data, having means for updating a segment of a data record that is received via the communication interface in the form of one or a plurality of data packets over an unsecured data link, the segment being identified by a version number, characterized in that the means for updating the segment classify the range of values for the version number into two sub-ranges, hereinafter called "old" and "new" taking into account the periodicity of the range of values and the current version number, so that the sub-range "new" may span values in the upper part of the range of values starting from the current version number up to a defined value in the lower part of the range of values, or that the sub-range "old" may span values in the lower part of the range of values starting from the current version number down to a defined value in the upper part of the range of values, in that the means for updating the segment perform a check as to the range in which the version number of a newly received segment lies, in that the means for updating the segment accept the newly received segment as a current segment if the check revealed that the version number of the newly received segment lies in the range "new", and in that the means for updating the segment reject the newly received segment if the check revealed that the version number of the newly received segment lies in the range "old".

14. Device according to claim 13, characterized in that the means for updating the segment ignore the newly received segment if the comparison of the further data revealed that the compared data do not match.

* * * * *